(12) United States Patent
Termini et al.

(10) Patent No.: US 10,522,943 B1
(45) Date of Patent: Dec. 31, 2019

(54) MAGNETICALLY SECURING DETACHABLE ELECTRONIC CABLE ASSEMBLY AND METHOD

(71) Applicants: Calista A. Termini, Woodland Hills, CA (US); Jennifer J. Termini, Agoura Hills, CA (US); John W. Cramer, IV, Huntingdon Beach, CA (US)

(72) Inventors: Calista A. Termini, Woodland Hills, CA (US); Jennifer J. Termini, Agoura Hills, CA (US); John W. Cramer, IV, Huntingdon Beach, CA (US)

( * ) Notice: Subject to any disclaimer, the term of this patent is extended or adjusted under 35 U.S.C. 154(b) by 0 days.

(21) Appl. No.: 16/138,843

(22) Filed: Sep. 21, 2018

(51) Int. Cl.
| | |
|---|---|
| *H01R 13/60* | (2006.01) |
| *H01R 13/62* | (2006.01) |
| *H01R 24/38* | (2011.01) |
| *G06F 1/18* | (2006.01) |

(52) U.S. Cl.
CPC .......... *H01R 13/6205* (2013.01); *G06F 1/18* (2013.01); *H01R 24/38* (2013.01)

(58) Field of Classification Search
CPC ............ H01R 13/6205; H01R 13/4538; H01R 13/438; H01R 24/28; H01R 24/30
See application file for complete search history.

(56) References Cited

U.S. PATENT DOCUMENTS

| | | | |
|---|---|---|---|
| 1,849,966 A * | 3/1932 | Ureles | F21V 21/02 248/343 |
| 2,170,287 A | 8/1939 | Kinnebrew | |
| 2,933,711 A * | 4/1960 | Eaton | H01R 13/633 439/316 |
| 3,144,527 A | 4/1964 | Tolegian | |
| 3,808,577 A | 4/1974 | Mathauser | |
| 4,146,288 A * | 3/1979 | Ramsay | H01R 13/625 285/2 |
| 4,168,105 A * | 9/1979 | Herrmann, Jr. | H01R 13/623 439/319 |
| 7,066,739 B2 | 6/2006 | McLeish | |
| 7,201,613 B2 * | 4/2007 | Sasaki | H01R 13/2421 439/700 |
| 7,637,746 B2 | 12/2009 | Lindberg et al. | |
| 8,348,678 B2 | 1/2013 | Hardisty et al. | |
| 8,944,826 B1 | 2/2015 | Wilkolaski et al. | |
| 9,431,182 B2 * | 8/2016 | Kim | H01H 1/58 |
| 9,893,451 B2 * | 2/2018 | Zhang | H01R 11/30 |
| 10,312,623 B2 * | 6/2019 | Kim | H01R 13/62 |
| 10,355,402 B2 * | 7/2019 | Degner | H01R 13/03 |
| 2012/0257346 A1 * | 10/2012 | Hulet | H04M 1/04 361/679.32 |

* cited by examiner

*Primary Examiner* — Xuong M Chung Trans
(74) *Attorney, Agent, or Firm* — Charmasson, Buchaca & Leach, LLP

(57) ABSTRACT

A versatile device for quickly and conveniently linking electronic apparatuses includes a pair of cooperating bodies with mating interfaces, and magnetically coupling elements having an adjustable degree of attraction and retention. Angularly keyed, selective geometrical interfaces between the bodies facilitate and assure correct relative orientation and mating. A light indicator attests to proper electrical connection between the bodies.

12 Claims, 12 Drawing Sheets

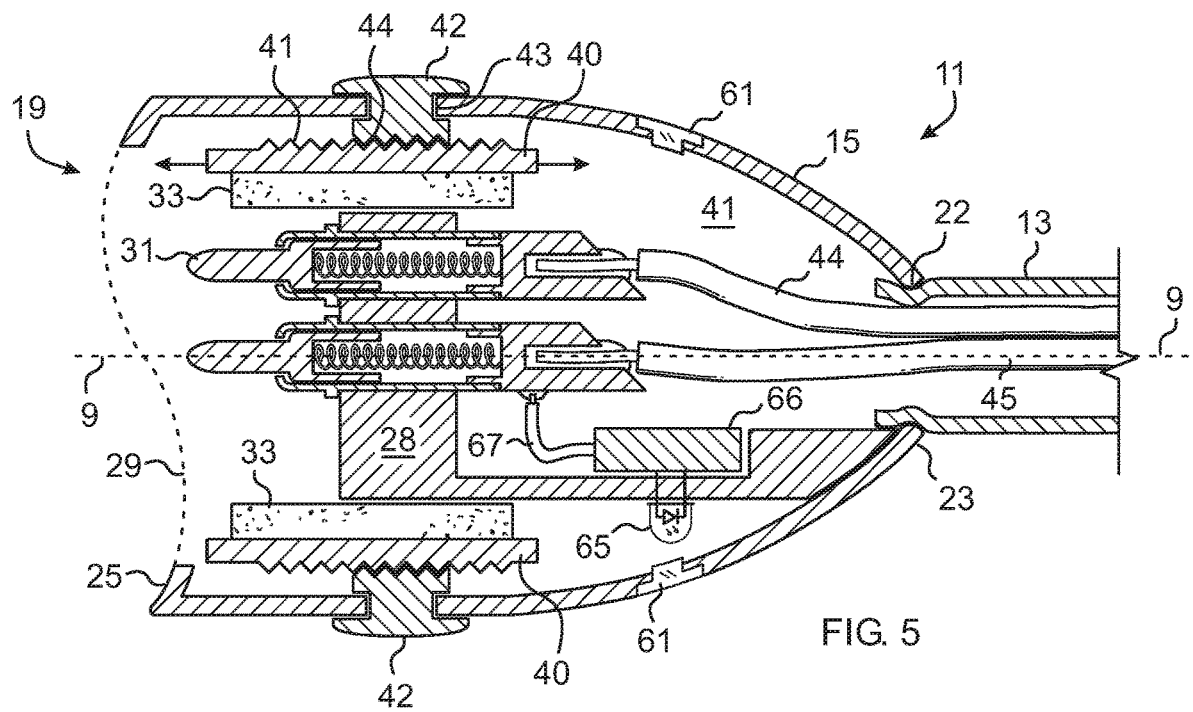
FIG. 5
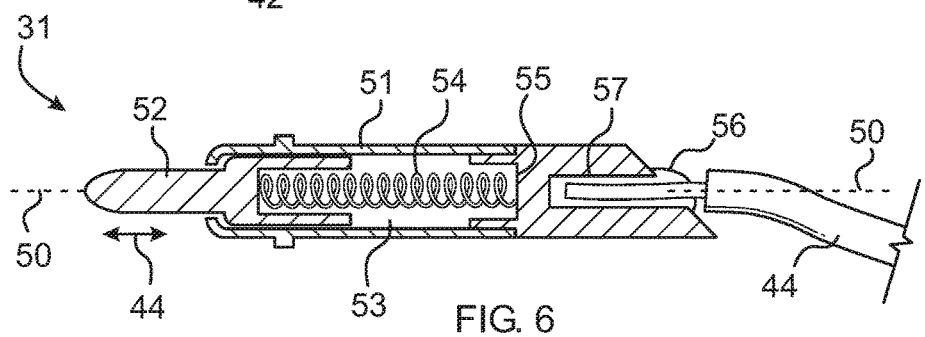
FIG. 6
```
Selecting a pair of separate bodies having
angularly keyed interface surfaces, and      ~71
electrical interconnect terminals, and
magnetically cooperative elements
                    ↓
Mating the bodies at their interfaces         ~72
                    ↓
Adjusting the axial location of one of the
magnetically cooperative elements             ~73
while the bodies remain mated
```
FIG. 7

MAGNETICALLY SECURING DETACHABLE ELECTRONIC CABLE ASSEMBLY AND METHOD

FIELD OF THE INVENTION

This invention relates to electronic cable and connector assemblies used in linking electronic devices, and more specifically digital implements such as mobile phones, computers and their peripherals.

BACKGROUND

Electronic devices such as mobile phones, tablets, and computer workstations and their peripheral devices often require a multitude of interconnections through electronic cables that become easily entangled and connectors that may be inadvertently unplugged. For example, a laptop computer may electronically connect to an outboard, portable, external hard disk drive via a cable engaging their respective USB ports. Such cables can be inadvertently tripped over causing the devices to be pulled from their resting positions on the desktop, and onto the floor, potentially resulting in mechanical shock damage to the devices.

Another problem faced by many modern cables is that the plugs at the end of the cables and/or the receptacles into which they are engaged can often become damaged by tweaking motions over many cycles of connecting and disconnecting, resulting in ineffectual electronic connection.

Another problem faced by many cables is there may be a single angular orientation of the plug which allows it to connect to the receptacle of the device. For example USB type-A connector plug connects in a single angular orientation, yet the plug often has the same substantial appearance in two angular orientations. The incorrect orientation may appear to be correct, frustrating attempts to establish the connection. This can be time consuming for users seeking to establish rapid connections.

Various so-called break-away cables have been proposed, such as in Lindberg et al., U.S. Pat. No. 7,637,746. However, the strength of the magnetic force may be too weak in some circumstances where rigorous activity is anticipated between the connected devices. Alternately, the strength of the magnetic force may be too strong in those circumstances where there may be some difficulty disconnecting the cables by persons who lack the adequate strength or dexterity, or where the cables themselves may be subject to damage by repetitively disengaging a strong magnetic connection.

Therefore, there is a need for an electronic cable interconnect device and method which addresses one or more of the above problems.

SUMMARY

The principal and secondary objects of the invention are to provide an improved breakaway electronic cable connection. These and other objects are achieved by a magnetically biased connector wherein the strength of a magnetic connection can be adjusted.

In some embodiments there is provided a device for linking electronic apparatuses which comprises: a first body comprising a first number of electrical terminals; a second body separate from said first body; said second body comprising a second number of electrical terminals; wherein said first and second number of electrical terminals are arranged to conductively interconnect when said first and second bodies are mated; a first element comprising a magnet attached to said first body; a second element comprising magnetic material attached to said second body; and, wherein at least one of said first and second elements is securably movable with respect to one of said first and second bodies to which said at least one of said first and second elements is attached.

In some embodiments said at least one of said first and second elements is axially translatable in relation to an other one of said first and second elements while said electrical terminals remain mated.

In some embodiments said device further comprises: an actuator attached to said at least one of said first and second elements; wherein said actuator shaped and dimensioned to be hand-manipulated, and wherein manipulation of said actuator causes movement of said at least one of said first and second elements with respect to one of said first and second bodies to which it is attached.

In some embodiments said device further comprises: a tubular carriage carrying said at least one of said first and second elements; said tubular carriage having an externally threaded portion; and, wherein said one of said first and second bodies comprises an internally treaded cavity engaged by said externally treaded portion.

In some embodiments said one of said first and second bodies comprises an indicator which is illuminated when said cooperating mating electrical terminals are mated.

In some embodiments said first number and said second number are equal; and wherein said device further comprises a first electrically conductive cable extending from said first body, and a second electrically conductive cable extending from said second body.

In some embodiments said first and second bodies comprise mutually compatible mating interfaces having an angularly keyed surfaces whereby said first and second bodies mate in a specific relative angular orientation.

In some embodiments said angularly keyed surfaces have a sinusoidally undulating shapes nestingly in phase with one another.

In some embodiments each of said first and second bodies has a truncated ovoid shape.

In some embodiments each of a plurality of said terminals comprises: a post outwardly biased from a support block by a biasing member.

In some embodiments the device further comprises: an aggregate biasing force consisting of a summation of a biasing force for each of said biasing member for all of said plurality of said terminals; and, said aggregate biasing force is overcome by a magnetic attractive force between said magnet element and said magnetic material.

In some embodiments there is provided a method for releaseably electrically interconnecting a pair of separate bodies having a plurality of electrical terminals said method comprises: selecting said bodies so that a first one of said bodies carries a first magnetically cooperative element and a second one of said bodies carries second magnetically cooperative element; wherein said first and second magnetically cooperative elements are oriented to cooperatively bias said bodies toward one another while said bodies are mated; mating said bodies along a pair of angularly keyed interfacing surfaces; wherein said mating establishes a disconnectable electrical connection between said bodies through said plurality of electrical terminals; and, adjusting an attractive force between said first and second magnetically cooperative elements while said bodies are mated.

In some embodiments said pair of angularly keyed interfacing surfaces comprise sinusoidally undulating shapes nestingly in phase with one another.

In some embodiments said method further comprises: illuminating an indicator on said first one of said bodies when said bodies are mated.

In some embodiments said adjusting comprises: manipulating a hand-manipulatable actuator determining an axial position of said first magnetically cooperative element.

The original text of the original claims is incorporated herein by reference as describing features in some embodiments.

In this way the above embodiments can provide cable assemblies and connectors with a degree of stability and retention that can be configured and adjusted in order to prevent accidental failures or equipment damage.

BRIEF DESCRIPTION OF THE DRAWINGS

FIG. 5 is a diagrammatic cross-sectional side view of the male connector body.

FIG. 6 is a diagrammatic cross-sectional side view of a spring-loaded connector pin sub-assembly.

FIG. 7 is a flow chart diagram of a method for electrically interconnecting cables according to an exemplary embodiment of the invention.

DESCRIPTION OF THE EXEMPLARY EMBODIMENT(S)

Figure 1:
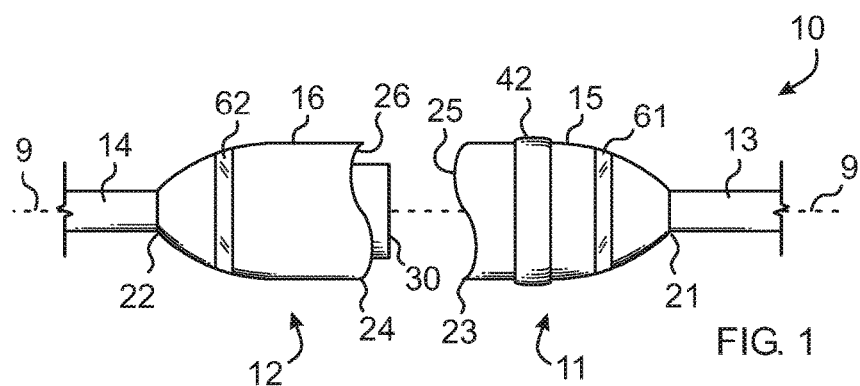
FIG. 1 is a diagrammatic side elevational view of a disconnected matable pair of connector bodies for magnetically securing cable assembly according to an exemplary embodiment of the invention.

Referring now to the drawing, there is shown in FIGS. 1-4 a cable assembly 10 particularly suited to linking two electronic devices equipped with standard USB connectors. The assembly comprises a male connector body 11 and a female connector body 12 each mounted on the ends of respective cables 13,14 which can be terminated at their opposite ends by a USB or other device terminator such as a plug. One of the bodies includes a permanent magnet and the other body includes magnetic material, such as ferrous material or another magnet. In this way it can be said that each body carries an element which is magnetically cooperative with a separate element on the other body. A first one of the magnetically cooperative elements can be either a permanent magnet or other ferromagnetic material which can attractively cooperate with a corresponding magnetically cooperative element attached to the other connector body. In other words, a magnetically attractive force can be established between the two magnetically cooperative elements so that the connector bodies are biased toward one another while properly mated and the electrical connection maintained.

When the male and female connectors are mated, electrical conductivity between the cables is established. Mated connectors can be separated by applying a sufficient axial separating force component which overcomes the attractive force keeping the bodies mated. This breakaway characteristic of the cable assembly can be useful to automatically disconnect the bodies when unexpected axial tension forces are applied to the cable, such as when a person trips against the connected cable, thus avoiding damage to the connected devices, and/or injury. The strength of the attractive force between the bodies can be adjusted by changing the axial separation between the magnetically cooperative elements while the bodies are engaged.

In the following exemplary embodiment, the male connector body 11 carries the permanent magnet, and the female connector body carries the corresponding magnetic material. Those skilled in the art will readily appreciate how those parts can be swapped. The word "substantially" is used because manufacturing imprecision and inaccuracies can lead to non-symmetricity and other inexactitudes in the shape, dimensioning and orientation of various structures.

Both the male connector body 11 and the female connector body 12 can include a housing 15,16 having a generally truncated ellipsoidal shape substantially symmetric about an axis 9. This shape allows both bodies to be made using common tooling, to be uniformly balanced between the two bodies, and to provide a smooth outer surface to help avoid snags.

The interface surfaces between the bodies can have shapes which are not axially symmetric as will be described below. Both bodies can have a substantially circular cable entry aperture at a first narrow end 21,22 for accepting the cable carrying electrically conductive wiring. Both bodies can have an opposite end 23,24 for forming an interface 25,26 with the other body. The interface 25 of the male connector body can include a substantially circular central opening 27 providing access to a male connector 29 which includes a number of electrical terminals formed by spring-loaded electrical contact pin sub-assemblies 31 radially and angularly spaced apart by an electrically insulating support block 28. The interface 26 of the female connector body includes a centrally extending female connector 30 having a central receptacle 34 which includes a number of electrical terminals in the form of electrically conductive contact pads 33 oriented to contact the ends of the contact pin sub-assemblies when the connectors are connected. Thus, the pin sub-assemblies and contact pads provide cooperating mating electrical terminals between the two bodies. The number of pin sub-assemblies and contact pads can be equal, providing a one-to-one correspondence. Alternately, the number of pin sub-assemblies and contact pads can be unequal, where one of the bodies having a greater number of terminals can interface with two or more types of mating bodies, each having a different number of terminals.

Figure 2:
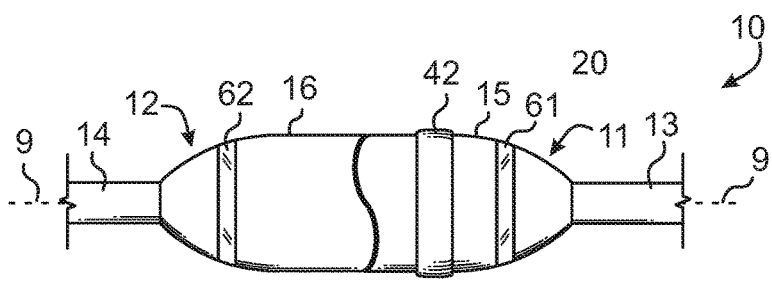
FIG. 2 is a diagrammatic side elevational view of the assembly of FIG. 1 in a mated configuration.
Figure 3:
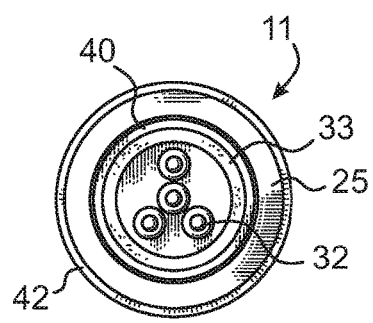
FIG. 3 is a diagrammatic front end elevational view of the male connector body.

The selective geometrical interfaces 25,26 of the respective connector bodies 11,12 are angularly keyed so that the interfaces mate in a specific relative angular orientation. Specifically, each interface can have an axially and angularly undulating outer surface just inside the radial periphery of the housing such that the resultant shape of each interface can be described as resembling the intersection of a solid cylinder with the surface of a sinusoidal planar surface wave. When viewed from the end, as shown in FIG. 3, the surface can be generally ring-shaped. When viewed from the side, as shown in FIG. 1, the surface can have a generally sinusoidal shape. In other words, the shapes on the respective mutually compatible mating interfaces have angularly keyed, abutting surfaces whereby the bodies mate in a specific relative angular orientation when in axial alignment. In this exemplary embodiment the abutting surfaces have a sinusoidally undulating shape nestingly in phase with one another. Thus, when the connectors are properly mated, as shown in FIG. 2, the surfaces intimately and nestingly contact one another in axial and angular alignment. This unique shape also acts a readily ascertainable indicator of angular alignment in that the bodies will clearly and visibly not nest together while the bodies are out of angular alignment. This unique body shape also both bodies to have substantially the same housing shape and thereby reduce manufacturing costs.

Referring now to FIG. 5, the male connector plug body 11 includes an axially slidable and securable tubular carriage 40 which can be formed by a substantially cylindrical sleeve having externally threaded portion 41 engaged by the internally threaded cavity 44 of a thumb wheel 42 rotatively mounted within a circumferential channel 43 radially penetrating through the outer wall of the housing 15. The carriage carries a hollow substantially cylindrical magnetically cooperative element, in this case a magnet 33. The thumb wheel acts as a hand-manipulatable actuator for axially translating the carriage and thus the magnet with respect to the male connector plug body as indicated by the arrows. The support block 28 resides radially inwardly from the carriage in order to avoid interfering with the axial movement of the carriage.

Figure 4:
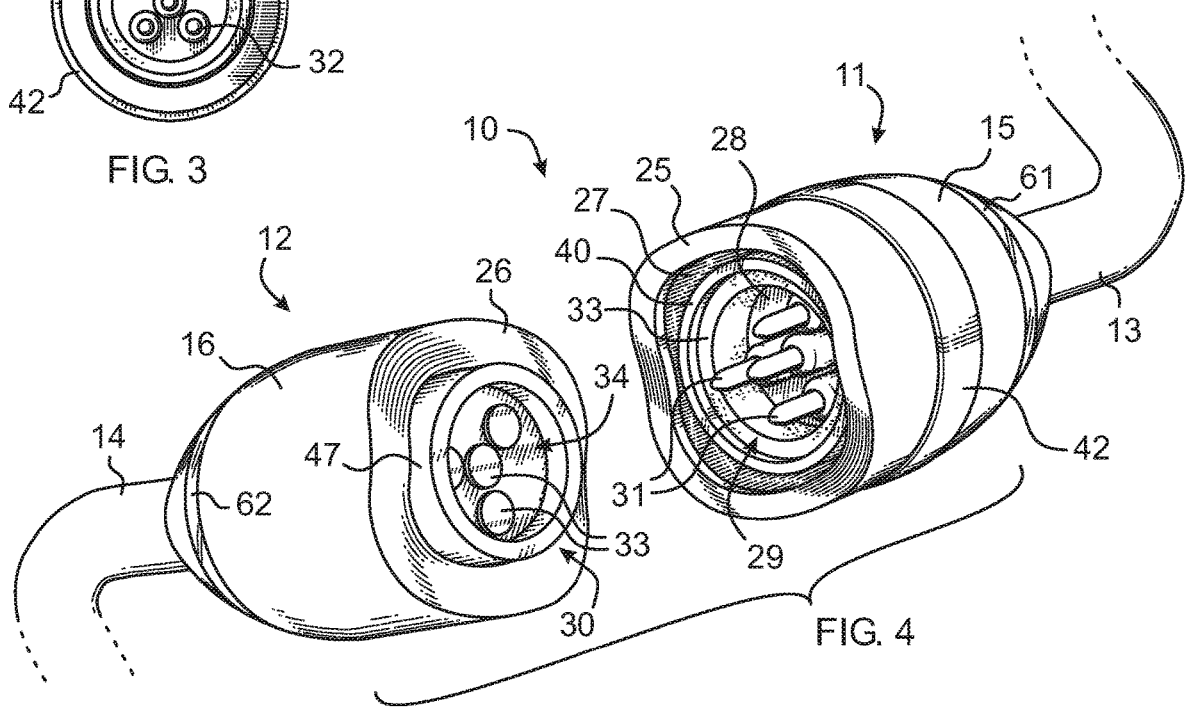
FIG. 4 is a diagrammatic perspective view of the assembly of FIG. 1 showing the interfaces of both the male and female connector bodies.
Figure 8:
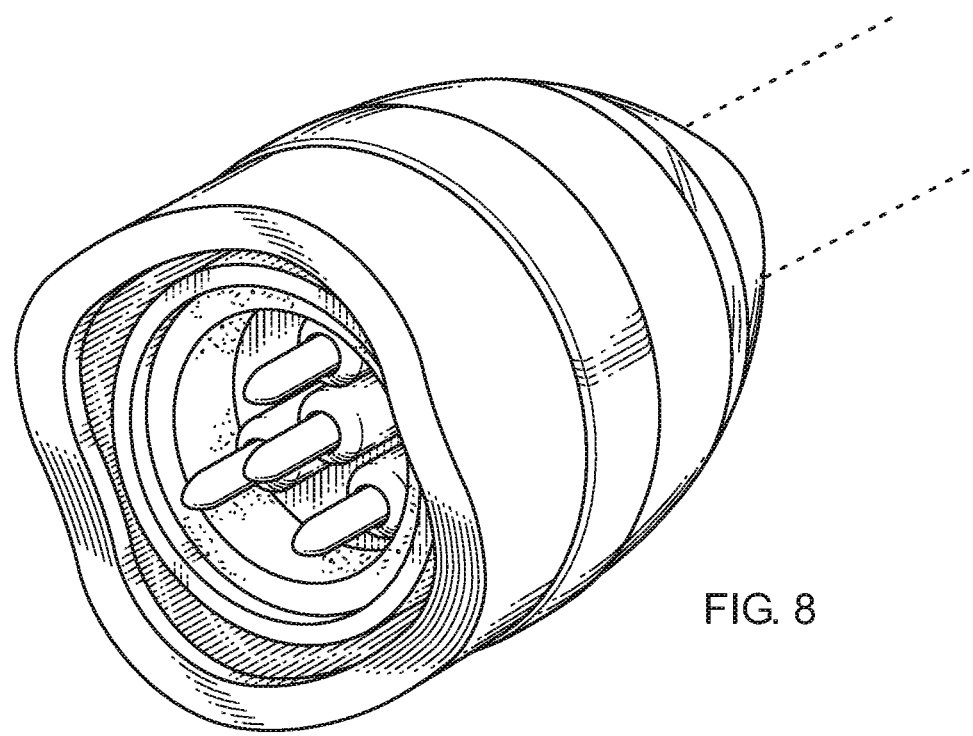
FIG. 8 is a front, top, left perspective view of a magnetically securing cable plug showing a single male connector body according to an embodiment of our design.
Figure 9:
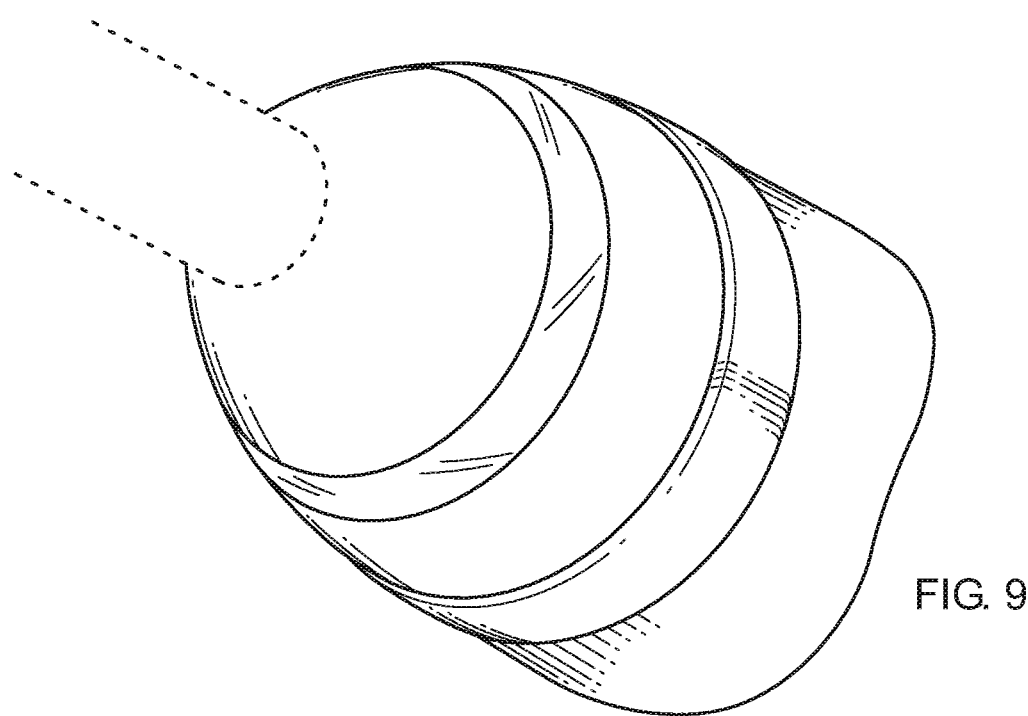
FIG. 9 is a back, bottom, right perspective view thereof.
Figure 10:
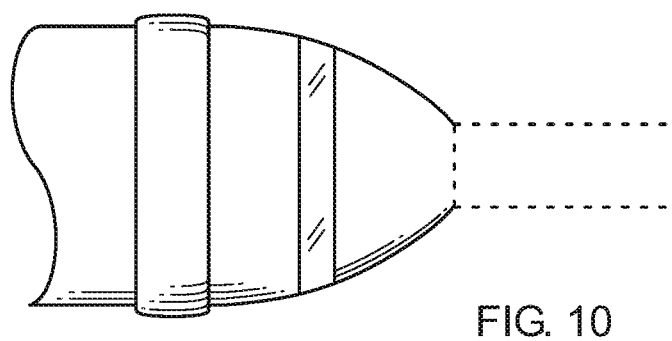
FIG. 10 is a left side elevation view thereof, the right side elevation view being a mirror image thereof.
Figure 11:
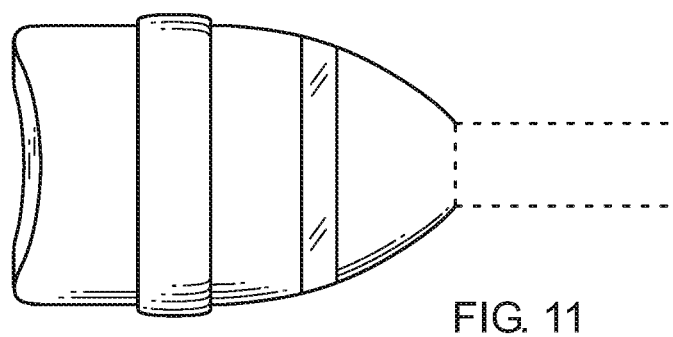
FIG. 11 is a top plan view thereof.
Figure 12:
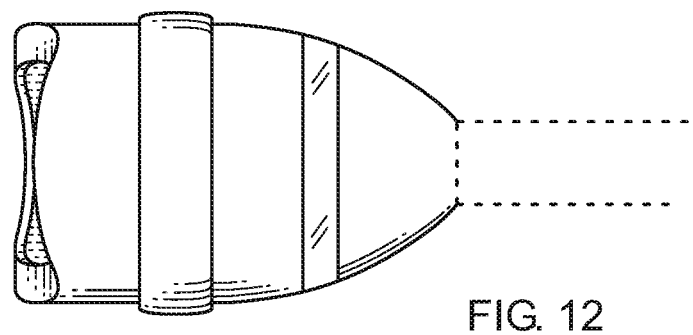
FIG. 12 is a bottom plan view thereof.
Figure 13:
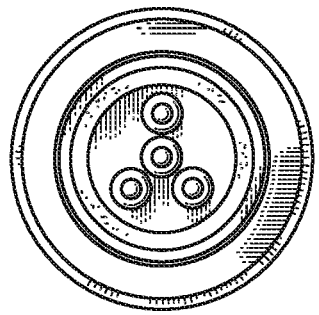
FIG. 13 is a front elevational view thereof.
Figure 14:
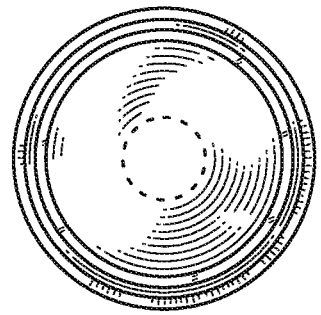
FIG. 14 is a back elevational view thereof.
Figure 15:
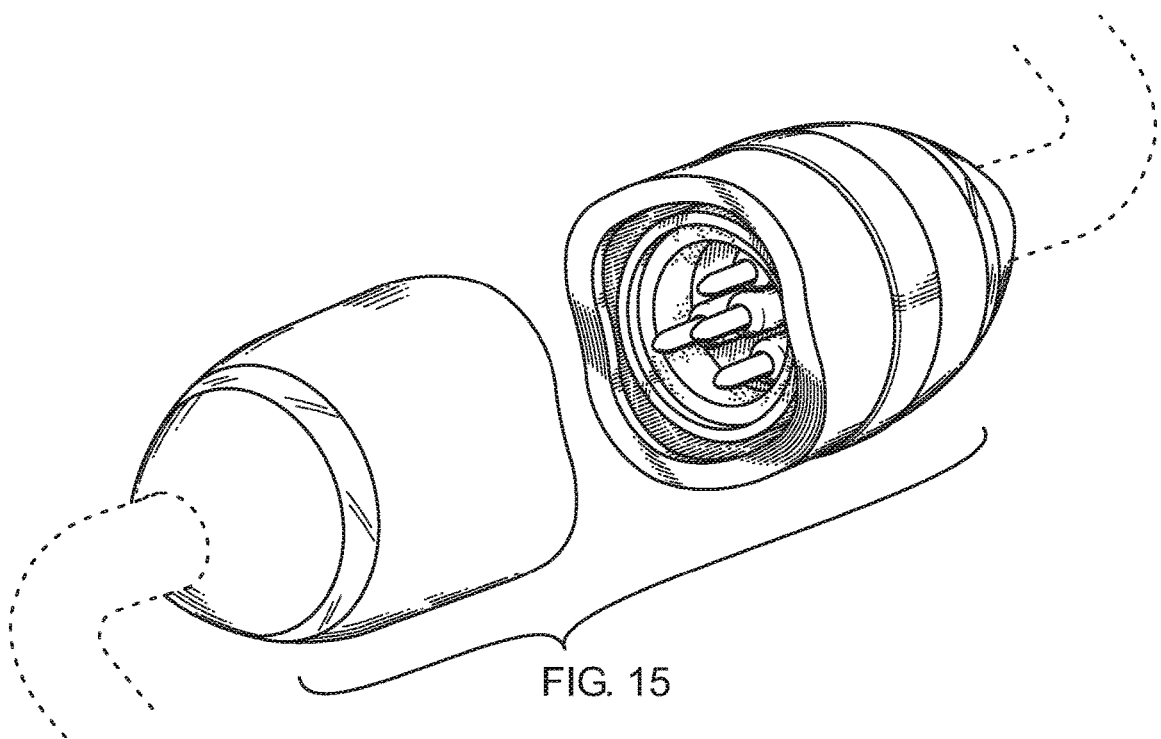
FIG. 15 is a front, top, left perspective view of a magnetically securing cable plug showing a matable pair of connector bodies according to an alternate embodiment of our design.
Figure 16:
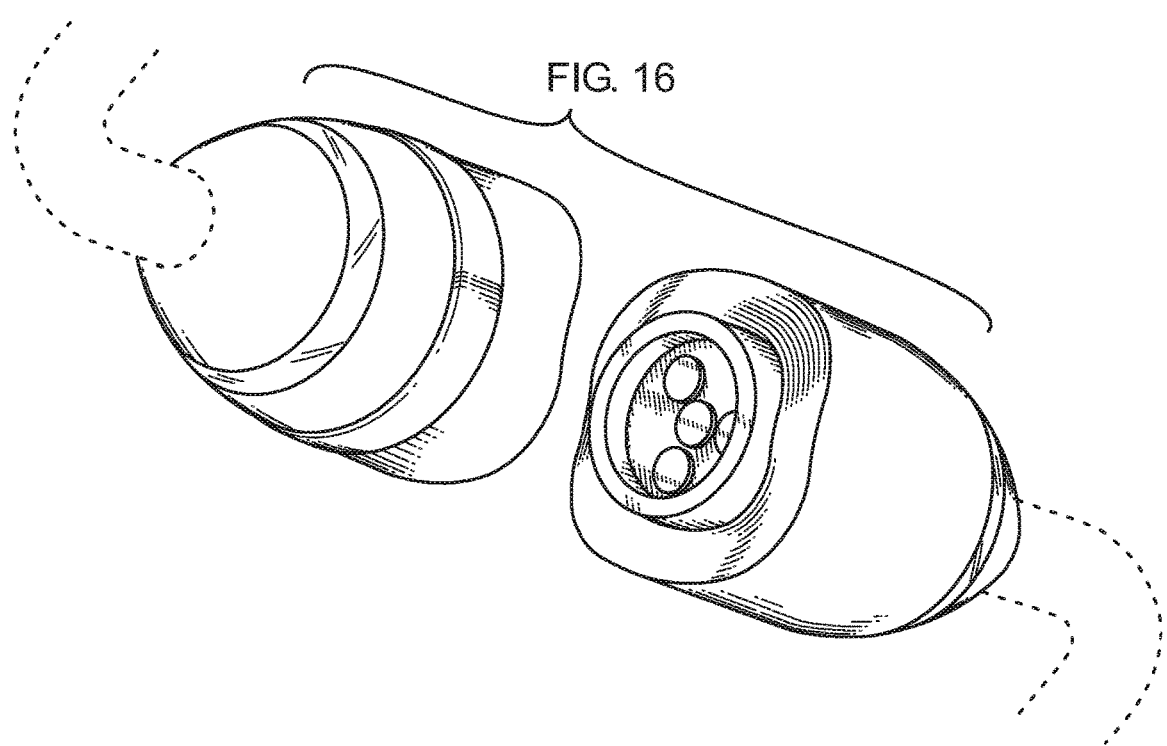
FIG. 16 is a back, bottom, right perspective view thereof.
Figure 17:
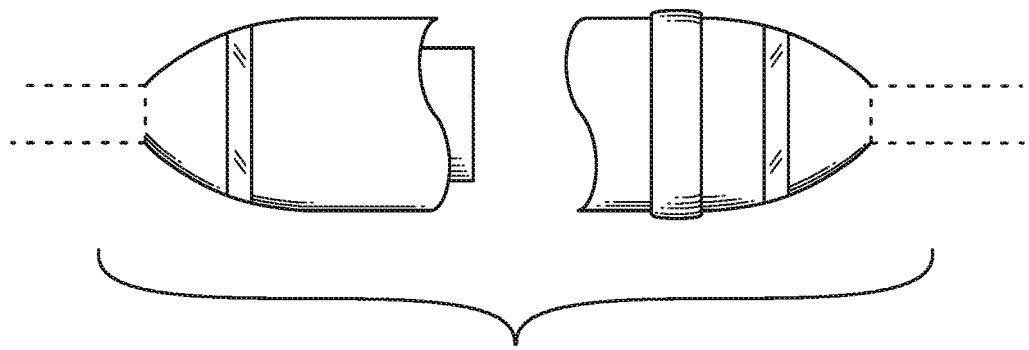
FIG. 17 is a left side elevation view thereof, the right side elevation view being a mirror image thereof.
Figure 18:
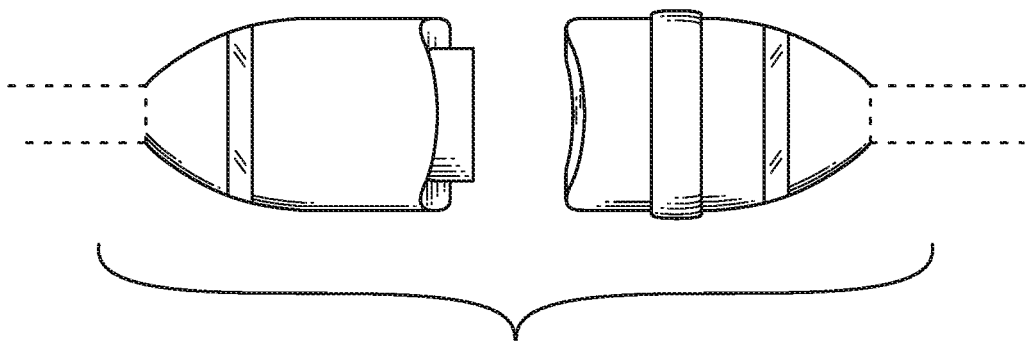
FIG. 18 is a top plan view thereof.
Figure 19:
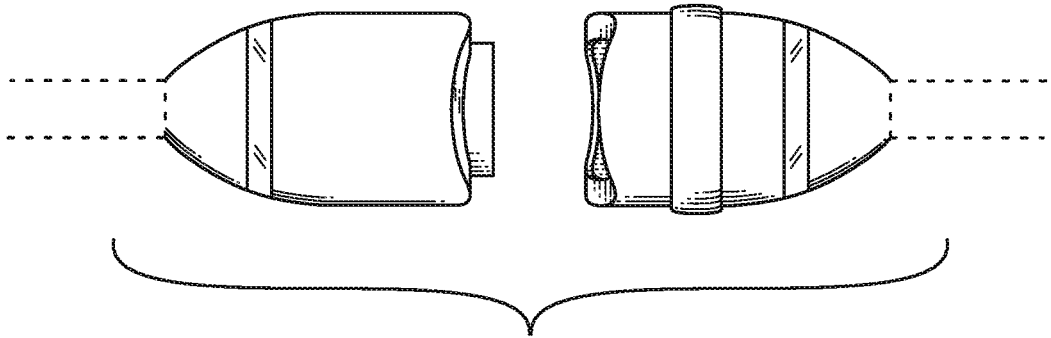
FIG. 19 is a bottom plan view thereof.
Figure 20:
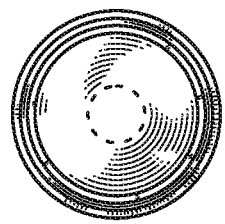
FIG. 20 is a front elevational view thereof, the back elevational view being a mirror image thereof.
Figure 21:
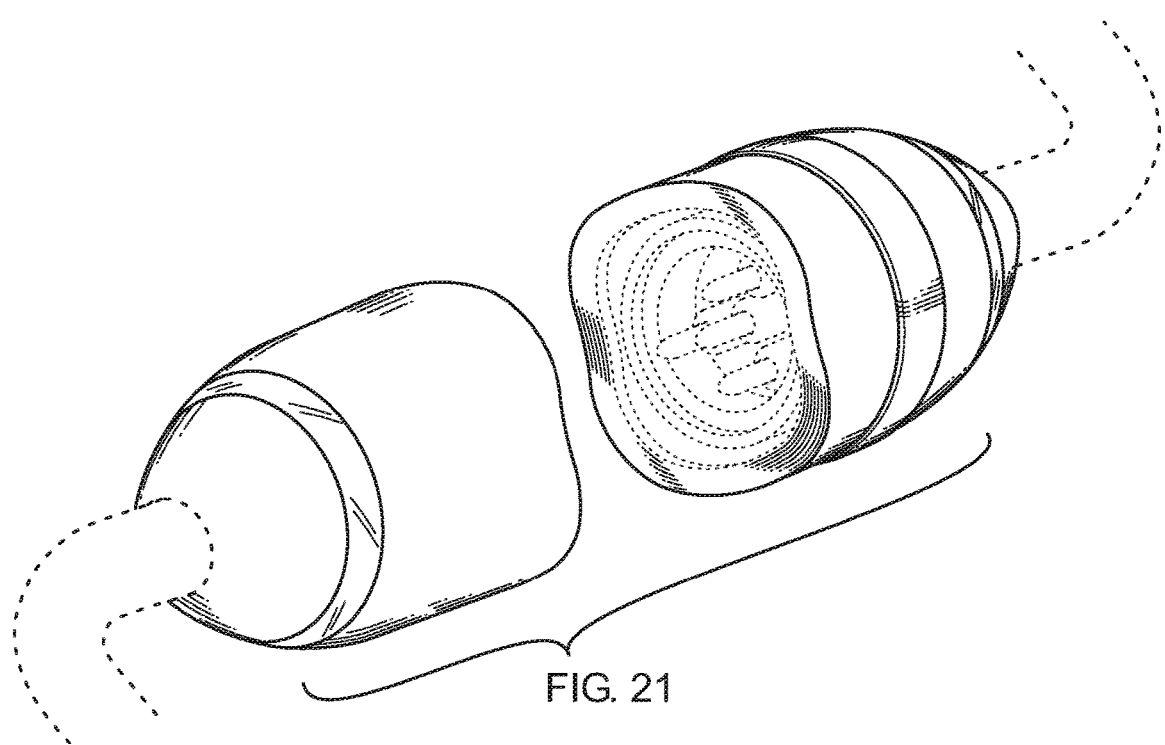
FIG. 21 is a front, top, left perspective view of a magnetically securing cable plug showing a matable pair of connector bodies disclaiming the electrical connectors according to an alternate embodiment of our design.
Figure 22:
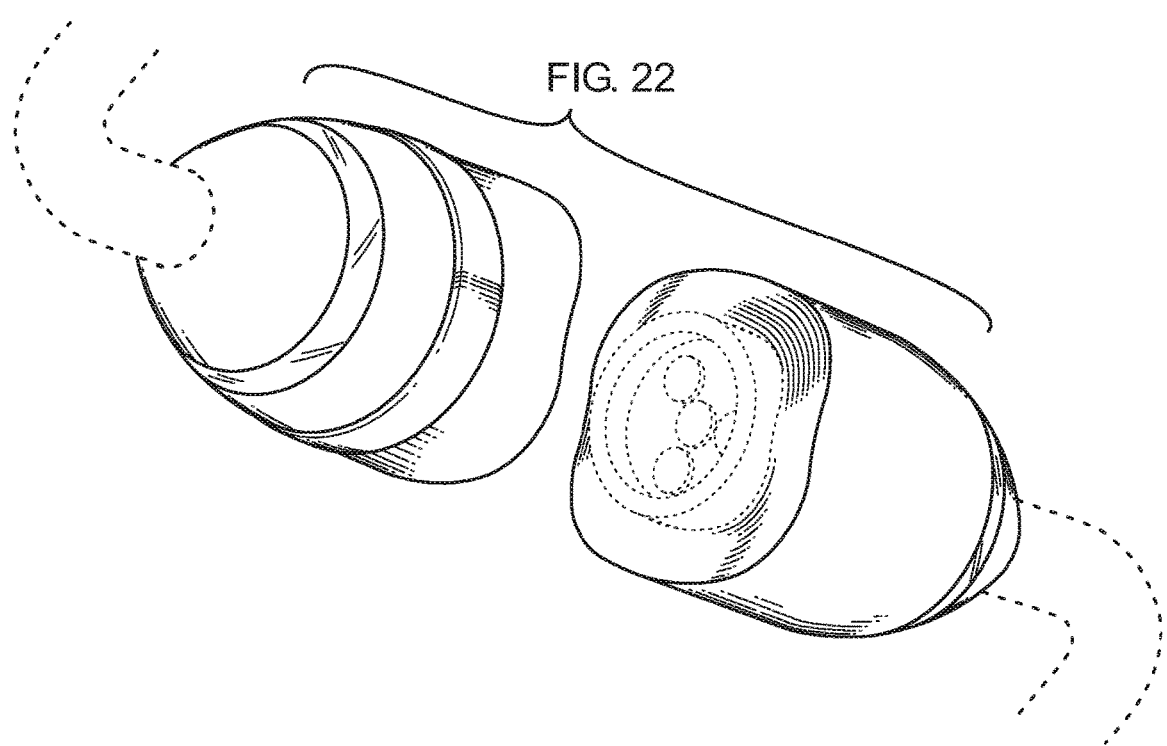
FIG. 22 is a back, bottom, right perspective view thereof.
Figure 23:
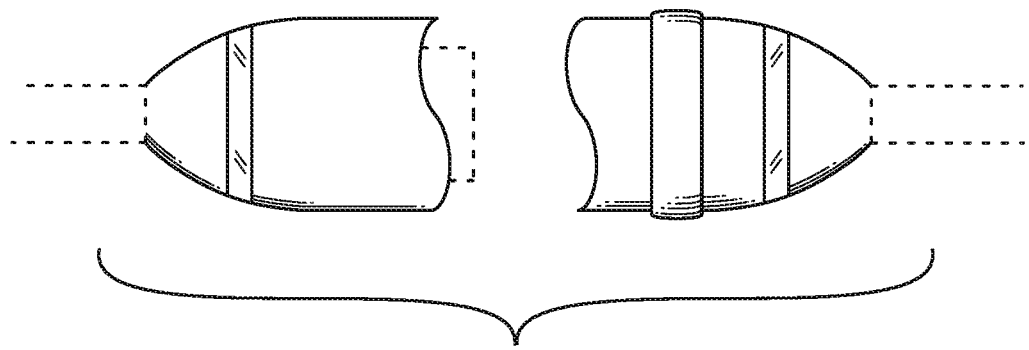
FIG. 23 is a left side elevation view thereof, the right side elevation view being a mirror image thereof.
Figure 24:
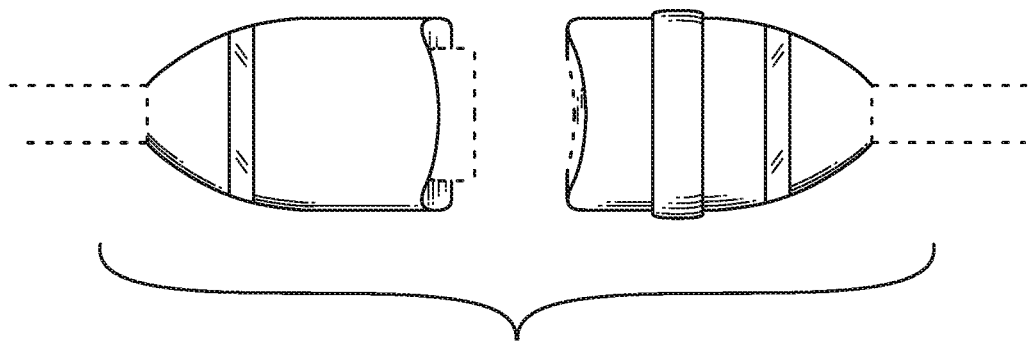
FIG. 24 is a top plan view thereof.
Figure 25:
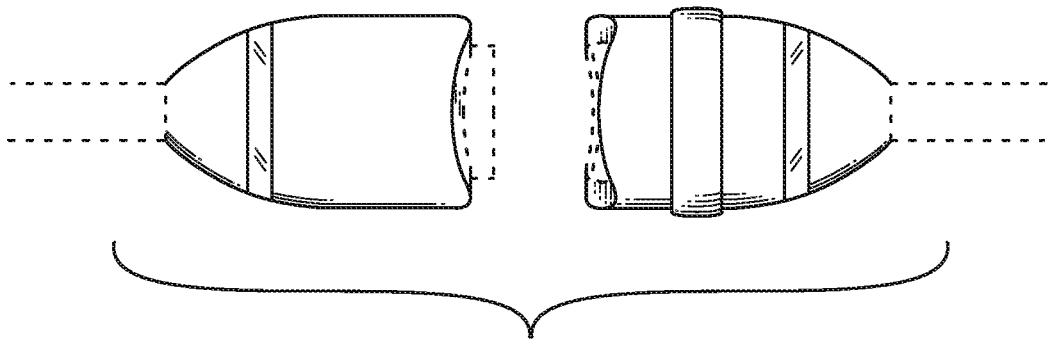
FIG. 25 is a bottom plan view thereof.
Figure 26:
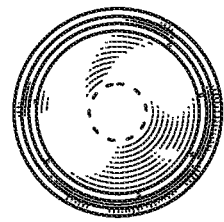
FIG. 26 is a front elevational view thereof, the back elevational view being a mirror image thereof.
Figure 27:
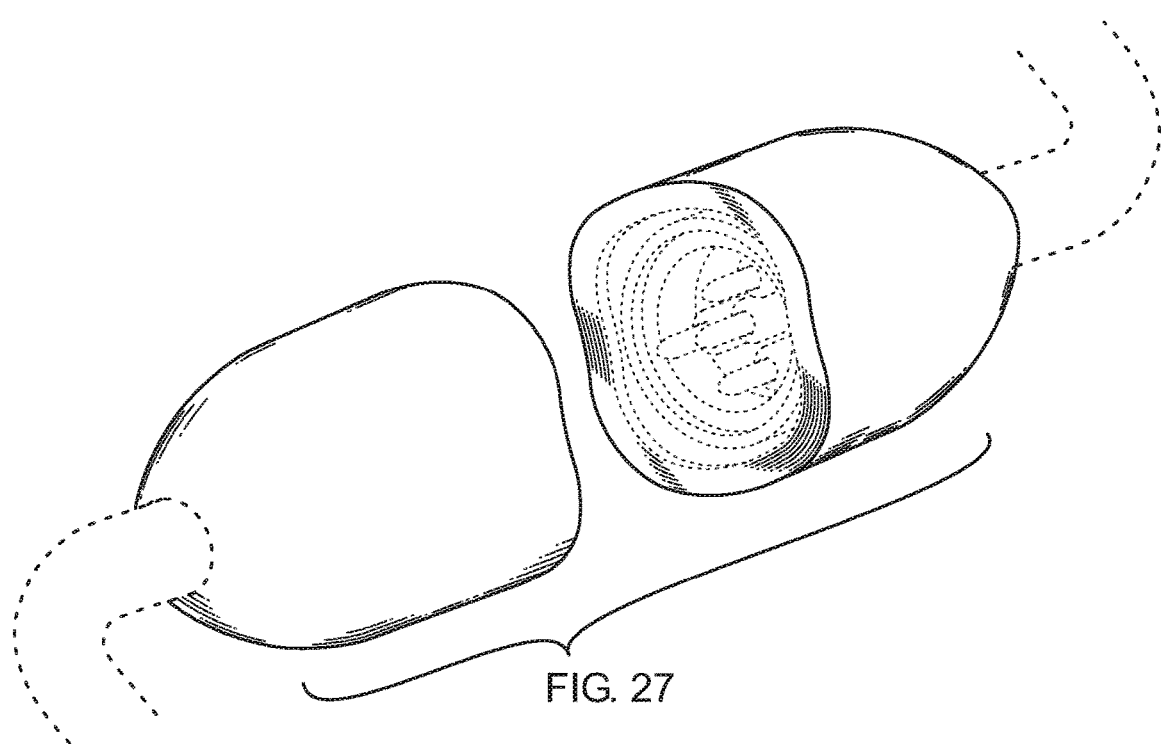
FIG. 27 is a front, top, left perspective view of a magnetically securing cable plug showing a matable pair of connector bodies disclaiming the electrical connectors according to an alternate embodiment of our design.
Figure 28:
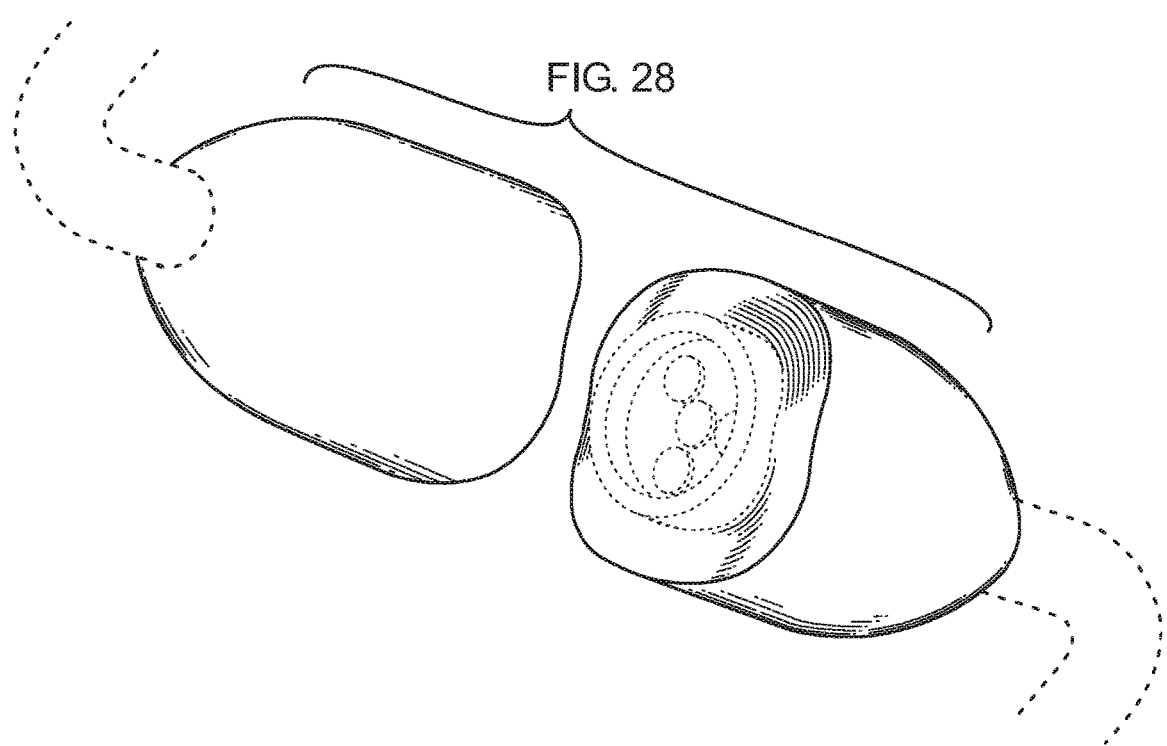
FIG. 28 is a back, bottom, right perspective view thereof.
Figure 29:
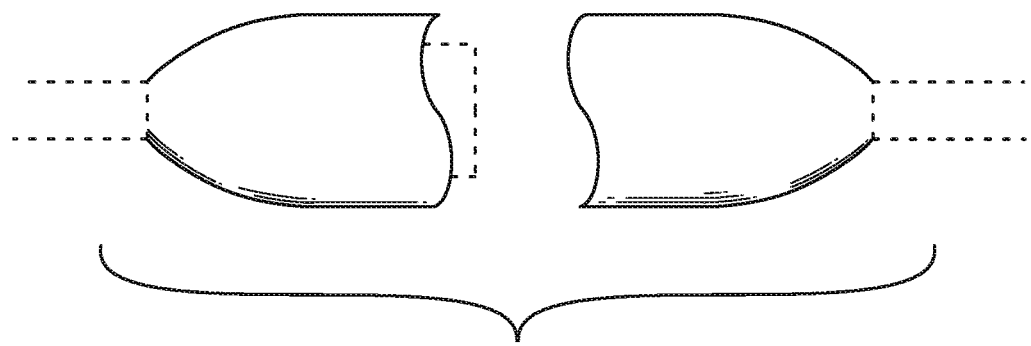
FIG. 29 is a left side elevation view thereof, the right side elevation view being a mirror image thereof.
Figure 30:
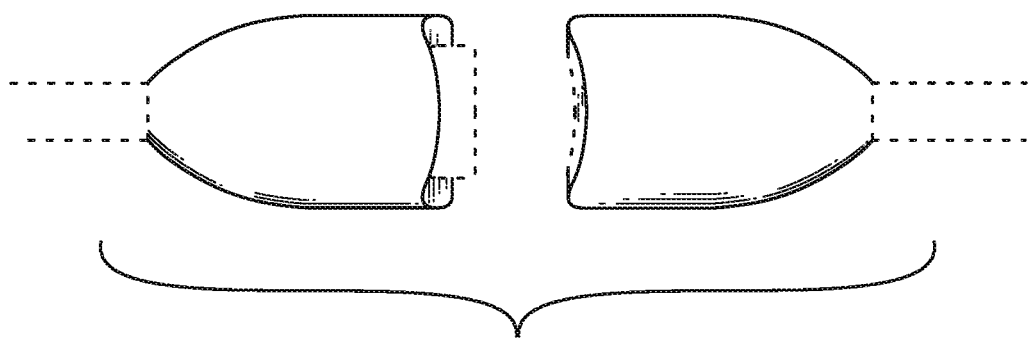
FIG. 30 is a top plan view thereof.
Figure 31:
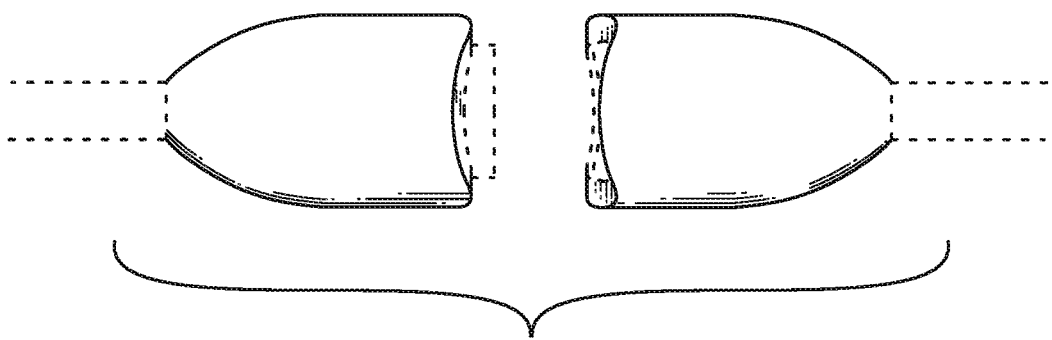
FIG. 31 is a bottom plan view thereof.
Figure 32:
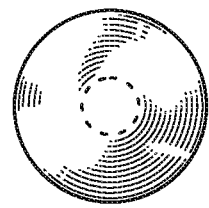
FIG. 32 is a front elevational view thereof, the back elevational view being a mirror image thereof.
Figure 33:
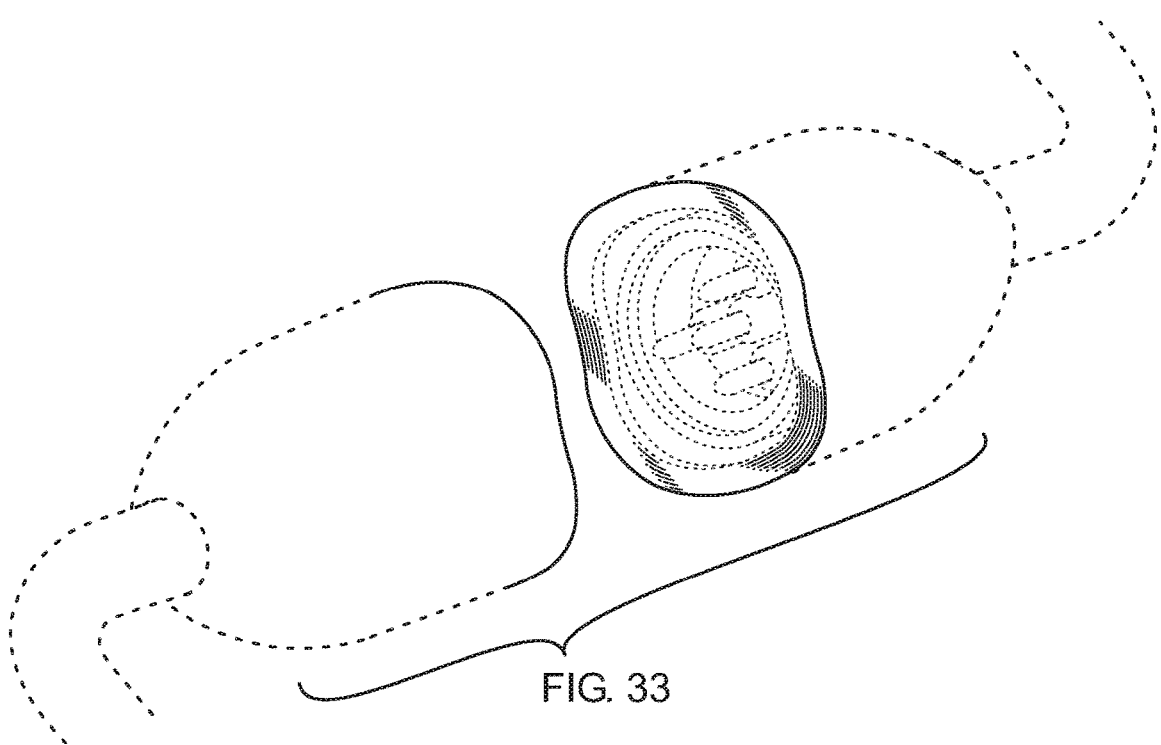
FIG. 33 is a front, top, left perspective view of an undulating, keyed orientation interface for a matable pair of connector bodies for a magnetically securing cable plug according to an alternate embodiment of our design.
Figure 34:
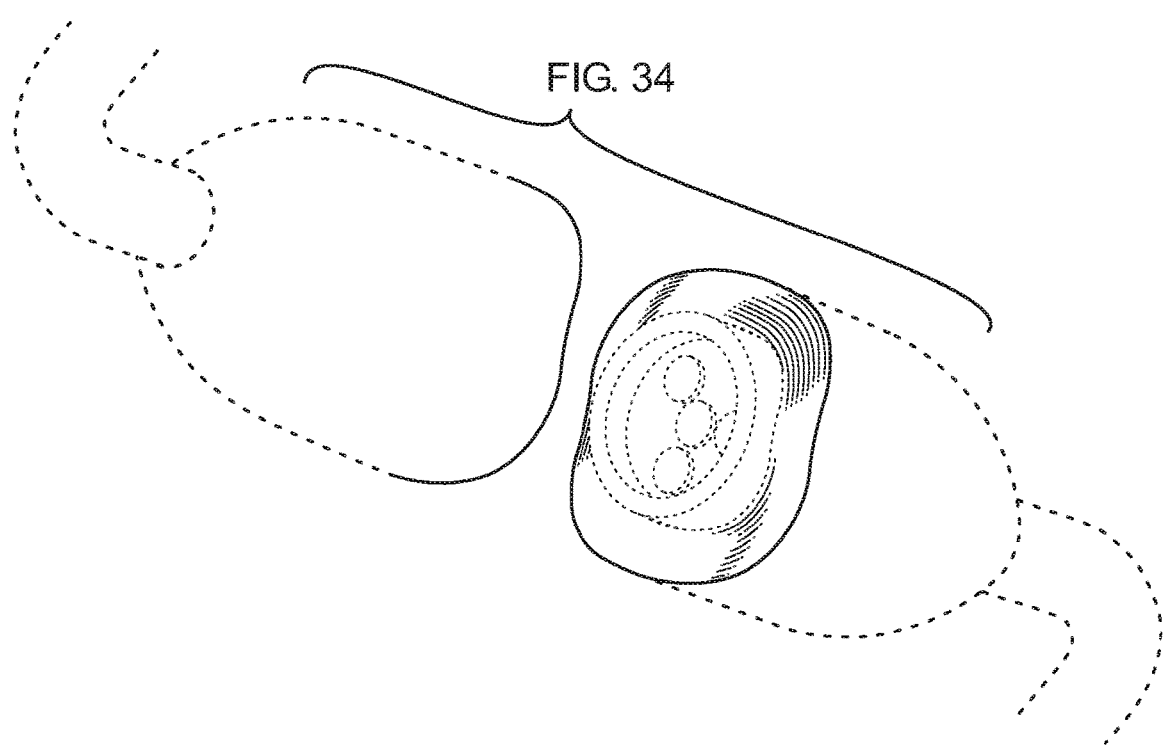
FIG. 34 is a back, bottom, right perspective view thereof.
Figure 35:
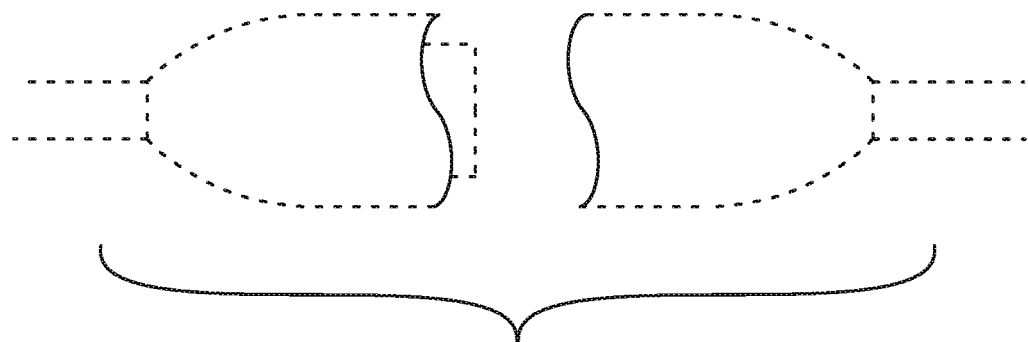
FIG. 35 is a left side elevation view thereof, the right side elevation view being a mirror image thereof.
Figure 36:
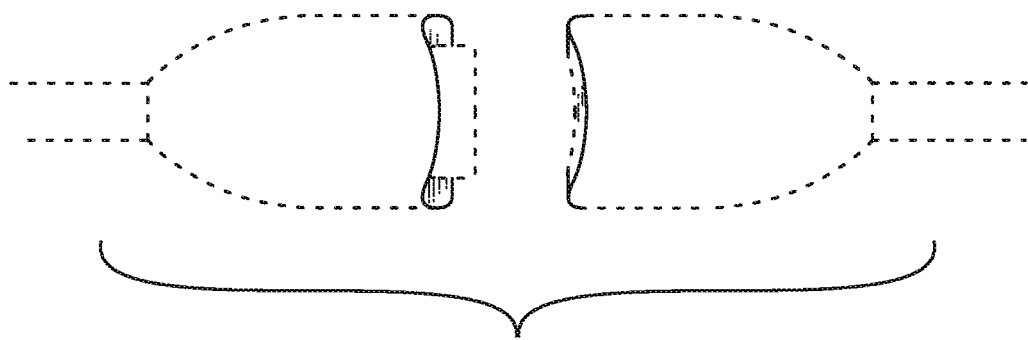
FIG. 36 is a top plan view thereof.
Figure 37:
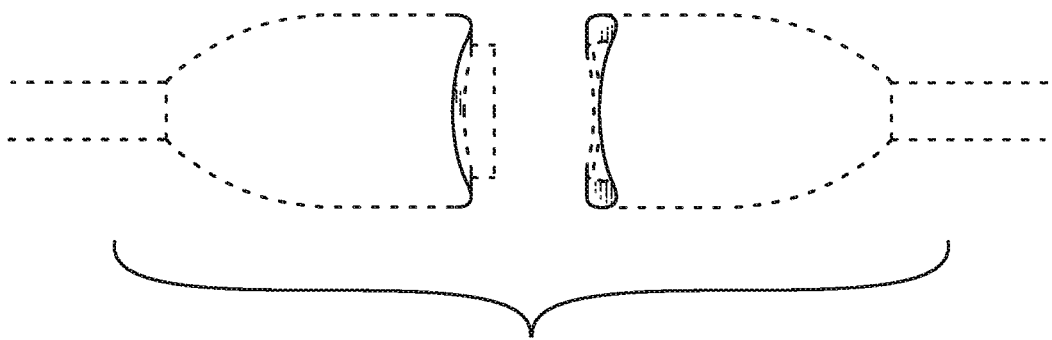
FIG. 37 is a bottom plan view thereof.
Figure 38:
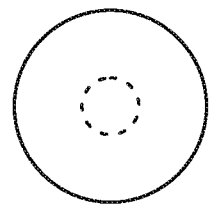
FIG. 38 is a front elevational view thereof, the back elevational view being a mirror image thereof.

As shown in FIG. 4, the female connector plug body 12 also carries the female connector 30 formed by a substantially cylindrical tubular ferrule 47 surrounding the receptacle 34. The ferrule is made from ferromagnetic material and thus acts as a magnetically cooperative element in reaction to the magnet 33 in the male connector body 11. Both the magnet and the ferrule can have commensurate diameters so that the two elements are brought into close proximity when the bodies are properly mated. Further, the size of the central opening 27 of the male connector body is shaped and dimensioned to accommodate penetration of the female connector therethough.

By manipulating the thumb wheel 42, the tubular carriage 40 including the magnet 33 can be translated axially toward or away from the interface 25 thereby increasing or decreasing the distance between the magnet and its corresponding magnetic material element on the other body, and thus decreasing or increasing respectively the magnet attractive force between them while the bodies are mated and the electrical connection between the bodies is maintained. The engaged threaded structures 41,44 allow the magnet to be securably moveable with respect to the male connector plug body 11. In other words, the axial position of the magnet can be adjusted in a non-discrete, fine adjustment manner where, at every position, the magnet is secured from inadvertent further movement. Although, the threaded engagement is typically preferred due to simplicity and ease of manufacture and use, other types of discrete position, and non-discrete position securably moveable connections can be used such as friction lockable telescoping structures as are often used for example in camera tripods, or spring-loaded locking slide structures as are often used for example in box cutter knives. Other axial adjustment mechanisms known to the art may also be used.

As shown in FIG. 5, the male connector body 11 housing 15 has a hollow interior 41 for containing the male connector mechanisms. The cable 13 includes a number of insulated wires 44,45 and a wrapping, braided shield (not shown) electrically connected to electrical ground structures in the male connector body. Each of the wires can be soldered to one of the electrically conductive contact pin sub-assemblies 31 to other electrical terminals within the housing 15, or can remain unconnected.

As shown in FIG. 6, each spring-loaded electrical contact pin sub-assembly 31 can include an electrically conductive sheath 51 elongated along an elongation axis 50. The sheath can be slidingly engaged by an electrically conductive post 52 which can travel axially though the central lumen 53 of the sheath between a distal extended position as shown and more proximal axial positions. The post is biased toward the extended position by a compression spring 54 located in the lumen and bearing against the post and the proximal end 55 of the lumen. A wire 44 can be soldered 56 to a terminal 57 on the sheath to establish an electrical connection between the distal tip of the post and the wire. In this way the post can retract slightly within the sheath as it comes into contact with a corresponding contact pad 33 on the female connector 30 ensuring an electrical connection between the post and pad even though the distance between the male connector 29 and female connector varies slightly.

Both the male connector body 11 and the female connector body 12 can include an indicator 61,62 which is illuminated when the electrical terminals are mated. Alternately, one or the other, or neither of the connector bodies can include the illuminatable indicator. The indicator 61 can be a window made of translucent material such as clear plastic which engages a passageway through the housing 15. The window can be illuminated by a light source such as an LED 65 powered by an electronic module 66 electrically connected 67 to at least one of the pin subassemblies 31. Similar illumination circuitry can be employed in the female connector body 12 to illuminate its indicator 62.

It is important to note that the electrical connection between the male connector 29 and the female connector 30 may be established regardless of the telescoping setting of the carriage 40. The furthest range of axial movement of the carriage is selected to go from a maximum attractive magnetic potential without interfering with the intimate seating of the interface surfaces, to a minimum attractive magnetic potential when the carriage is fully retracted within the housing of the male connector.

It is further important to note that the strength of the magnetic attractive force between the two magnetically cooperative elements, namely the magnet 33 and the ferrule 47 is strong enough to overcome the combined force of the compression springs 54 of all the contact pin sub-assemblies 31. Otherwise, the combine force of the compression springs would drive the connectors apart. In other words, the summation of a biasing forces for all of the compression springs forms an aggregate biasing force which is overcome by the magnetic attractive force between the magnetically cooperative elements 33,47.

It is further important to note that the sinusoidal surface of the respective interfaces 25,26 can cause movement between the interfaces toward their proper angular orientation and facilitates proper pitch and yaw orientation to help the connectors dock with one another. In other words, the gently curving sinusoidal surfaces allow sliding and turning of the surfaces while they are in contact with one another as the two bodies come into proper relative axial alignment and angular orientation for the connectors to mate. As stated above the unique surfaces also act as a readily observable indication of misalignment when the surfaces do not nest.

A further advantage of the adjustable magnetic attractive strength is that the strength can be selected to be within a range where the bodies must be properly nested before the bodies are held together by the attractive force, overcoming gravity and thus the weight of the plug and cable. At greater separation distances, such as when the interface surfaces are misaligned, the attractive force can be made to be too weak to hold the bodies together. In this way, users are provided an unambiguous indication that the bodies are properly mated by the mere fact that they remain stuck together.

Another further advantage of the adjustable magnetic attractive strength is that the strength can be selected so that the force is strong enough to drive the bodies to auto-rotate to bring them into proper alignment. In other words, when the smooth interfacing surfaces of the bodies contact one another in an angularly misaligned condition, those surfaces are at acute, non-zero angles with respect to the axial attractive force. This can create torsional force components on the bodies which drive them toward angular alignment.

Another advantage of the above-described structures is that the pair of bodies can electrically join a medial portion of a multi-conductor electronic cable. By being located at a medial location on the cable, the bodies are located away from the end plugs of the cable, thus reducing the stresses on the end plugs/receptacles. In addition, the user can disconnect the cable at the bodies, rather than disconnecting at the end plugs, further reducing the number of connection/disconnection cycles on the end plugs/receptacles.

Referring to FIG. 7, there is shown a method 70 for releaseably electrically interconnecting a pair of separate bodies at the ends of multi-conductor electronic cables. The method includes selecting the bodies so that they have angularly keyed interface surfaces, electrical interconnect terminals located to interface and connect with one another, and magnetically cooperative elements so that there is an attractive force between the two bodies when mated 71. The bodies are then mated 72 by orienting them in a substantially coaxial, interface-to-interface manner, and rotating them relative to one another until their interfaces are in angular alignment, then pushing them together. Angular alignment can be easily discerned by the undulating surfaces of the interfaces. While the bodies are mated, the attractive force between said first and second magnetically cooperative elements can be adjusted 73 by rotating a thumb wheel on one of the bodies which moves a carriage carrying one of the magnetically cooperative elements.

FIGS. 8-14 show and claim our design for a magnetically securing cable assembly for use on personal electronic items such as computers, tablets, mobile phones and similar portable personal items, including a magnetically securable keyed orientation interface.

FIGS. 15-20 show and claim our design for a mating pair of magnetically securing cable assemblies for use on personal electronic items such as computers, tablets, mobile phones and similar portable personal items, including a magnetically securable keyed orientation interface.

FIGS. 21-26 show and claim our design for a mating pair of magnetically securing cable assemblies for use on personal electronic items such as computers, tablets, mobile phones and similar portable personal items, including a magnetically securable keyed orientation interface, disclaiming the electronic contacts.

FIGS. 27-32 show and claim our alternate design for a mating pair of magnetically securing cable assemblies for use on personal electronic items such as computers, tablets, mobile phones and similar portable personal items, including a magnetically securable keyed orientation interface, disclaiming the electronic contacts.

FIGS. 33-38 show and claim our alternate design for an undulating, keyed orientation interface for a matable pair of connector bodies for a magnetically securing cable assembly for use on personal electronic items such as computers, tablets, mobile phones and similar portable personal items.

While the exemplary embodiments of the invention have been described, modifications can be made and other embodiments may be devised without departing from the spirit of the invention and the scope of the appended claims.

What is claimed is:

1. A device for linking electronic apparatuses which comprises:
   a first body comprising a first number of electrical terminals;
   a second body separate from said first body;
   said second body comprising a second number of electrical terminals; wherein said first and second number of electrical terminals are arranged to conductively interconnect when said first and second bodies are mated;

a first element comprising a magnet attached to said first body;

a second element comprising magnetic material attached to said second body; and, wherein at least one of said first and second elements is securably movable with respect to one of said first and second bodies to which said at least one of said first and second elements is attached;

wherein said device further comprises:

an actuator attached to said at least one of said first and second elements; wherein said actuator shaped and dimensioned to be hand-manipulated, and wherein manipulation of said actuator causes movement of said at least one of said first and second elements with respect to one of said first and second bodies to which it is attached; and wherein said device further comprises:

a tubular carriage carrying said at least one of said first and second elements; said tubular carriage having an externally threaded portion; and, wherein said one of said first and second bodies comprises an internally treaded cavity engaged by said externally treaded portion.

2. The device of claim 1, wherein said at least one of said first and second elements is axially translatable in relation to an other one of said first and second elements while said electrical terminals remain mated.

3. The device of claim 1, wherein said one of said first and second bodies comprises an indicator which is illuminated when said cooperating mating electrical terminals are mated.

4. The device of claim 1, wherein said first number and said second number are equal; and wherein said device further comprises a first electrically conductive cable extending from said first body, and a second electrically conductive cable extending from said second body.

5. The device of claim 1, wherein said first and second bodies comprise mutually compatible mating interfaces having an angularly keyed surfaces whereby said first and second bodies mate in a specific relative angular orientation.

6. The device of claim 5, wherein said angularly keyed surfaces have a sinusoidally undulating shapes nestingly in phase with one another.

7. The device of claim 1, wherein each of said first and second bodies has a truncated ovoid shape.

8. The device of claim 1, wherein each of a plurality of said terminals comprises:

a post outwardly biased from a support block by a biasing member.

9. The device of claim 8, which further comprises:

an aggregate biasing force consisting of a summation of a biasing force for each of said biasing member for all of said plurality of said terminals; and, said aggregate biasing force is overcome by a magnetic attractive force between said magnet element and said magnetic material.

10. A method for releaseably electrically interconnecting a pair of separate bodies having a plurality of electrical terminals said method comprises:

selecting said bodies so that a first one of said bodies carries a first magnetically cooperative element and a second one of said bodies carries second magnetically cooperative element;

wherein said first and second magnetically cooperative elements are oriented to cooperatively bias said bodies toward one another while said bodies are mated;

mating said bodies along a pair of angularly keyed interfacing surfaces;

wherein said mating establishes a disconnectable electrical connection between said bodies through said plurality of electrical terminals; and, adjusting an attractive force between said first and second magnetically cooperative elements while said bodies are mated;

wherein said adjusting comprises:

manipulating a hand-manipulatable actuator determining an axial position of said first magnetically cooperative element; and, rotating a thumb wheel on said first one of said bodies, wherein said thumb wheel is internally threaded and engages an externally threaded portion of a tubular carriage carrying said first magnetically cooperative element.

11. The method of claim 10, wherein said pair of angularly keyed interfacing surfaces comprise sinusoidally undulating shapes nestingly in phase with one another.

12. The method of claim 10, which further comprises:

illuminating an indicator on said first one of said bodies when said bodies are mated.

* * * * *